United States Patent Office 3,457,699
Patented July 29, 1969

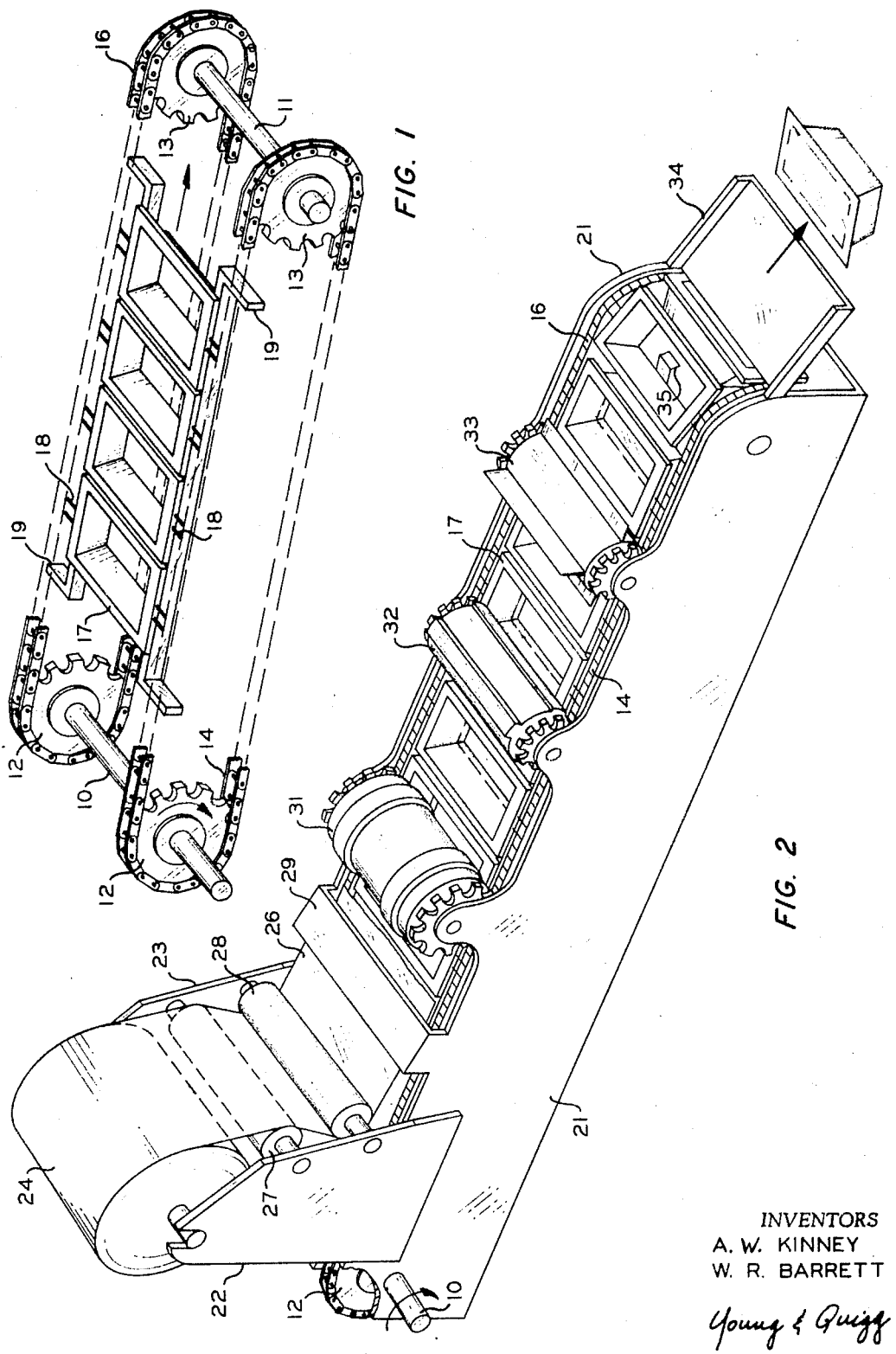

3,457,699
APPARATUS FOR SECURING COVER
MATERIAL TO CONTAINERS
Alfred W. Kinney and Willis R. Barrett, Fulton, N.Y., assignors to Phillips Petroleum Company, a corporation of Delaware
Filed Oct. 20, 1966, Ser. No. 588,045
Int. Cl. B65b 61/08, 51/16, 7/28
U.S. Cl. 53—373                                                4 Claims

ABSTRACT OF THE DISCLOSURE

A package sealing means comprising separate side sealing, end sealing, and cutting means to seal and separate packages in continuous unidirectional motion.

---

In one aspect this invention relates to sealing containers. In another aspect, this invention relates to securing cover material to containers. In another aspect this invention relates to a simplified packaging apparatus. In still another aspect this invention relates to a packaging method.

Plastic containers having a film cover have achieved considerable commercial success in the packaging field. In the packaging processes of sealing covers of flexible film onto preformed containers, it is important to maintain high handling speeds. In producing satisfactory seals, the proper combination of pressure, temperature and timing is important to make certain that the seal is effective and that the packaged material is not damaged. It is also important that the machinery which forms and seals the packages is as compact and economical as is consistent with efficient and reliable operation.

Accordingly, it is an object of this invention to provide an apparatus for securing a cover material to a container.

A further object of this invention is to advance a package and secure cover material thereto in a continuous manner, eliminating intermittent motion.

Still another object of this invention is to provide a packaging machine which is simple in construction, efficient in operation, and inexpensive to manufacture.

These and other objects of the invention will become apparent to one skilled in the art upon study of the following detailed description, the appended claims and the accompanying drawings.

FIGURE 1 is a diametric view of one embodiment of the conveying means of the packaging apparatus.

FIGURE 2 is a partially broken diametric view of a packaging machine.

Figure 3:
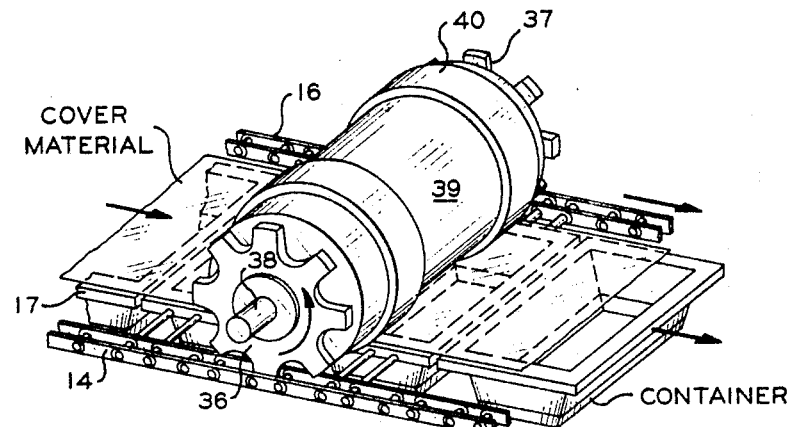
FIGURE 3 illustrates one embodiment of the means for sealing cover material to the sides of containers.

According to the invention, cover material is sealed to the sides of a continuously moving line of filled containers, then the cover material is sealed to the ends of the containers and the sealed continuous line of containers is separated into individual items while the line of containers is in continuous unidirectional motion.

Further in accordance with the invention, there is provided an apparatus for securing cover material to containers comprising means for continuously conveying a line of containers successively through a cover feeding and application zone, a side sealing zone, an end sealing zone, and a container separation zone, in combination with means for continuously feeding cover material to the containers, means for sealing covering material to the sides of containers, means for sealing cover material to the ends of containers, and means for separating the sealed continuous line of containers into individual items.

Referring now to the drawings wherein like reference numerals are used to denote like elements, the invention will be described in more detail.

In FIGURE 1, a pair of shafts 10 and 11 are provided with a pair of sprockets 12 and a pair of sprockets 13, respectively. A pair of endless chains 14 and 16 are mounted to travel over pairs of sprockets 12 and 13. The endless chains 14 and 16 support and carry a plurality of suitably spaced rectangular container pockets 17 which can be flexibly secured to the chains by suitable pins 18. The individual pockets are open at the top and can be shaped to support the side walls of the container which is placed in the pocket. If desired, a limiting bottom can be provided in the pocket. Additional support means 19 support the pockets 17 as they move through the sealing and cutting zones. Shaft 10 is rotated by a suitable driving means, not shown.

In FIGURE 2 the conveying mechanism is supported on a frame 21 and a pair of spaced support members 22 and 23 project upwardly from frame 21 to support a supply roll 24 of cover material 26 which is secured to a container in accordance with this invention.

Cover material 26 is fed through guide rollers 27 and 28 to a feed slot 29. Feed slot 29 aligns cover material 26 with the containers carried in pockets 17. Cover material 26 is sealed to the two sides of the container parallel to the direction of motion by a side sealer 31. Cover material is sealed onto the opposite ends of two adjacent containers by end sealer 32 as the continuously moving line of containers moves under the sealing elements. The line of sealed containers is separated by the action of cutting means 33. The individual cover containers are then transported to the discharge zone 34 wherein a strip member 35 supported on frame 21 contacts the underside of the containers and lifts them from pockets 17. This forces the sealed containers into chute 34 whereupon they are discharged from the apparatus.

In FIGURE 3, illustrating the side sealing means 31, of FIGURE 1 in detail, sprockets (driving gears) 36 and 37, carried upon a shaft 38, mesh with chains 14 and 16, respectively so that roller 39 mounted on shaft 38 rotates at the same speed as the chains, thus eliminating any relative motion between the containers carried in pockets 17 and the sealing elements 40 carried upon roller 39.

Figure 4:
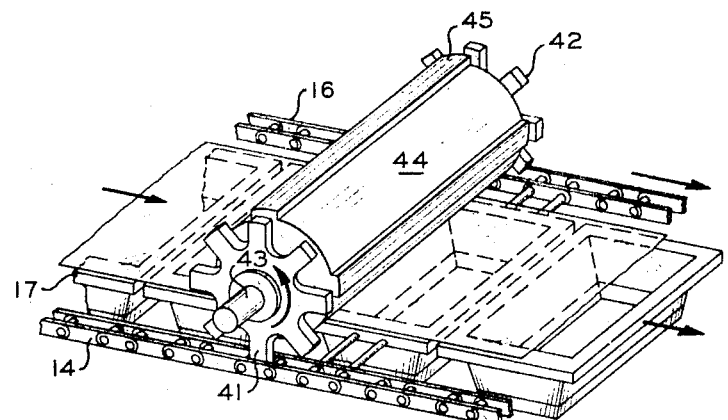
FIGURE 4 illustrates an embodiment of the end sealing means of this invention.

In FIGURE 4, depicting the end sealing means 32 of FIGURE 1, sprockets (driving gears) 41 and 42 are mounted on a rotatable shaft 43 and mesh with chains 14 and 16, respectively. Roller 44, carried on shaft 43, contains outwardly projecting sealing elements 45. Sealing elements 45 are of sufficient width that one element 45 will cover the area of two opposite ends of adjacent containers carried in pockets 17. Sealing elements 45 are spaced so that upon rotation of roller 44 one element 45 comes into contact with each of the area defined above as the containers move under the end sealing means.

Figure 5:
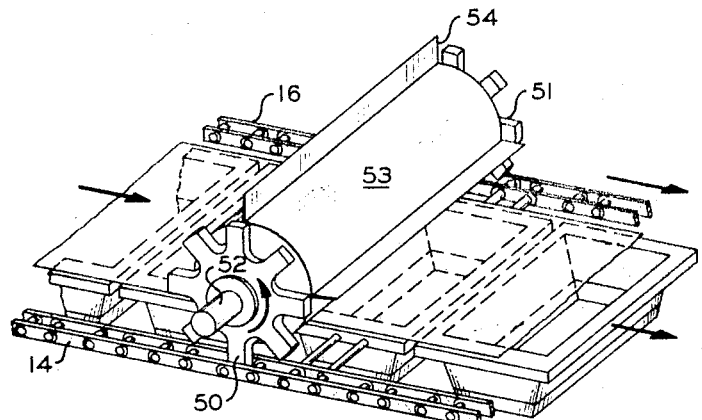
FIGURE 5 illustrates an embodiment of the means for separating a sealed line of containers into individual items.

FIGURE 5 shows container separation means 33 as having sprockets (driving gears) 50 and 51 mounted on a shaft 52, wihch carries roller 53. Roller 53 contains cutting edges 54 spaced so that the edges 54 transversely separate the cover material between adjacent containers upon rotation of the shaft. Sprockets 50 and 51 mesh with chains 14 and 16 to impart rotation to the separation means. Cutting edges 54 have beeen depicted as knife edges but suitable cover material cutting means, for example, thin heated wire, can be mounted on shaft 52.

In the operation of the above-described apparatus, filled containers are conveyed continuously from a pick-up zone in pockets 17 through the cover application zone 29, the side sealing zone 31, the end sealing zone 32, the cover separation zone 33, and discharge zone 34. A continuous web of cover material of sufficient width to cover the containers is fed onto and contacted with the line of containers as they move in continuous unidirectional motion. Cover material 26 is sealed to the sides of the containers as the containers come into contact with the rotating sealing elements 38.

Containers having cover materials sealed to their sides are conveyed beneath and contacted with rotating sealing elements 44, thus effecting the sealing of cover material to the ends of the containers. The motion of the sealed containers in pockets 17 creates a tension on the continuous web of cover material 26 and provides the force for drawing cover material 26 from supply roll 24. The containers are carried in pockets 17 adjacent to but not contacting each other so that a space is left for cutting edge 54 to penetrate and effect separation of the moving line of sealed containers. The sealed items can be collected from discharge chute 34 and packaged for shipping.

The single drive means, for example, an electric motor of rotating shaft 10 provides the actuating force for the entire mechanism and eliminates problems of synchronization of the different speeds of different machine elements. The continuous motion of the conveyance means creates a constant tension on the cover material. This constant tension along with the continuous contact of the side sealing elements serves to minimize creeping and wrinkling of the cover material in the direction opposite to conveyor flow. If heat sealing is used, sealing the sides and then sealing the ends of the containers reduces the mass that is heated at any one time and eliminates overheating and "bubbling" in the cover material as it is sealed to the container. The two step sealing operation also minimizes lubricating and metal seizing problems resulting from the heat transfer during heat sealing.

It is evident that the apparatus of this invention can be used for securing a variety of different cover materials to a variety of different formed containers. For example, it is possible to secure a cover to a formed container constructed of paper, plastic, metal, or other material. Similarly, the cover material can be paper, plastic, metal foil, and the like. The cover material can be heat sealed to the formed filled container or it can be secured by pressure alone. In some instances, it may be desirable to employ a pressure sensitive adhesive for the cover material. All of these materials and others are within the spirit and scope of the invention. Practice of the method and use of the apparatus of this invention results in the rapid effective sealing of packages through the use of a machine of simplified and economic construction.

Reasonable modification and variation are within the scope of this invention which sets forth a method of and apparatus for sealing cover material to containers.

That which is claimed is:

1. An apparatus for continuously sealing packages comprising:
   a frame;
   conveying means supported on said frame;
   means supported on said frame and above said conveying means to feed and align a continuous web of cover material of sufficient width to cover continuously moving containers in said conveying means;
   first sealing means supported on said frame to seal the cover material to the sides of the containers while being conveyed;
   second sealing means supported on said frame and spaced at least one container from said first sealing means to seal the ends of the continuously moving containers;
   cutting means supported on said frame and spaced at least one container from said second sealing means to separate the moving line of sealed containers into individual units;
   means to discharge the individual sealed containers from said apparatus;
   said conveying means comprising:
      two shafts rotatably supported between members of said frame;
      a pair of spaced sprockets carried upon each shaft;
      a pair of endless chains carried upon and meshing with said spaced sprockets;
      driving means operably connected to one of said shafts;
      pockets attached between said pair of chains and attached to support the walls of containers when carried therein;
      and at least one sprocket associated with each of said first sealing means, said second sealing means and said cutting means to drive said sealing and cutting means in synchronism with said conveying means.

2. An apparatus for continuously sealing packages comprising:
   a frame;
   conveying means supported on said frame;
   means supported on said frame and above said conveying means to feed and align a continuous web of cover material of sufficient width to cover continuously moving containers in said conveying means;
   first sealing means supported on said frame to seal the cover material to the sides of the containers while being conveyed;
   second sealing means supported on said frame and spaced at least one container from said first sealing means to seal the ends of the continuously moving containers;
   cutting means supported on said frame and spaced at least one container from said second sealing means to separate the moving line of sealed containers into individual units;
   said side sealing means comprising:
      a roller rotatably supported on said frame having raised sealing elements positioned to contact the tops of the containers on the sides parallel to the direction of movement of the containers;
      heating means within the roller for heating those portions of the roller that are in contact with the containers;
      and driving gears carried upon either end of said roller mounted to mesh with said conveying means.

3. An apparatus for continuously sealing packages comprising:
   a frame;
   conveying means supported on said frame;
   means supported on said frame and above said conveying means to feed and align a continuous web of cover material of sufficient width to cover continuously moving containers in said conveying means;
   first sealing means supported on said frame to seal the cover material to the sides of the containers while being conveyed;
   second sealing means supported on said frame and spaced at least one container from said first sealing means to seal the ends of the continuously moving containers;
   cutting means supported on said frame and spaced at least one container from said second sealing means to separate the moving line of sealed containers into individual units;
   said end sealing means comprising:
      a shaft rotatably mounted on a frame;
      a plurality of sealing elements positioned on the shaft so that one of the sealing elements transversely contacts the opposite ends of two adjacent containers upon rotation of the shaft;

heating means contained within said sealing elements;

and driving gears carried upon said shaft and positioned to mesh with said conveying means.

4. An apparatus for continuously sealing packages comprising:
- a frame;
- conveying means supported on said frame;
- means supported on said frame and above said conveying means to feed and align a continuous web of cover material of sufficient width to cover continuously moving containers in said conveying means;
- first sealing means supported on said frame to seal the cover material to the sides of the containers while being conveyed;
- second sealing means supported on said frame and spaced at least one container from said first sealing means to seal the ends of the continuously moving containers;
- cutting means supported on said frame and spaced at least one container from said second sealing means to separate the moving line of sealed containers into individual units;
- said cutting means comprising:
  - a shaft rotatably mounted on said frame;
  - cutting means carried upon said shaft and positioned so as to transversely sever the cover material joining the containers upon rotation of said shaft; and
  - driving gears carried upon said shaft and positioned to mesh with said conveying means.

References Cited

UNITED STATES PATENTS

| | | | |
|---|---|---|---|
| 2,549,122 | 4/1951 | Osterhof | 53—28 |
| 2,611,225 | 9/1952 | Williams | 53—180 |
| 3,193,978 | 7/1965 | Bader | 53—39 X |
| 3,007,295 | 11/1961 | Heinzer | 53—180 |
| 3,210,910 | 10/1965 | Seefluth | 53—39 X |
| 3,246,448 | 4/1966 | Amic | 53—373 |
| 3,283,469 | 11/1966 | McBrady et al. | 53—112 X |

THERON E. CONDON, Primary Examiner

R. L. SPRUILL, Assistant Examiner

U.S. Cl. X.R.

29—25.17; 338—333